United States Patent
Murabe et al.

(10) Patent No.: US 6,307,295 B1
(45) Date of Patent: Oct. 23, 2001

(54) SPINDLE MOTOR AND COMPLEX BEARING ASSEMBLY FOR USE WITH THE SPINDLE MOTOR

(75) Inventors: Kaoru Murabe; Makoto Otsuki; Osamu Komura, all of Itami (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/559,087

(22) Filed: Apr. 27, 2000

(30) Foreign Application Priority Data

Apr. 30, 1999 (JP) .................................................. 11-124194

(51) Int. Cl.$^7$ ................................................... H02K 7/09
(52) U.S. Cl. .......................................................... 310/90.5
(58) Field of Search ..................... 310/90, 90.5; 384/100, 384/107, 133, 193, 226, 112, 113, 132; 360/98.07, 99.04, 99.08

(56) References Cited

U.S. PATENT DOCUMENTS

| | | | |
|---|---|---|---|
| 3,746,407 | * 7/1973 | Stiles et al. ........................... | 384/133 |
| 4,523,800 | * 6/1985 | Yamashita et al. ................... | 310/90.5 |
| 4,988,906 | * 1/1991 | Littlefield ............................. | 310/90.5 |
| 5,448,121 | * 9/1995 | Tada ..................................... | 310/90.5 |
| 5,822,846 | * 10/1998 | Moritan et al. ..................... | 360/98.08 |
| 6,066,903 | * 5/2000 | Ichiyama ............................... | 310/90 |

* cited by examiner

Primary Examiner—Tran Nguyen
(74) Attorney, Agent, or Firm—McDermott, Will & Emery (57) ABSTRACT

A complex bearing assembly has a sleeve and a shaft inserted in the sleeve. The shaft is rotatably supported in the sleeve through radial and axial bearings, i.e., hydrodynamic bearing and magnetic bearing. In particular, the axial bearing includes first and second magnetic members or magnet rings. The first magnetic member is secured on the shaft in a coaxial fashion, but the second magnetic ring is secured on the sleeve in an eccentric fashion. This causes an eccentric bias that forces the rotating shaft to a certain radial direction, allowing the rotating shaft becomes to lose frictional contacts with the sleeve at lower rotational number. This in turn decreases wears of the sleeve and the shaft, increasing the durability of the bearing assembly.

18 Claims, 4 Drawing Sheets

SPINDLE MOTOR AND COMPLEX BEARING ASSEMBLY FOR USE WITH THE SPINDLE MOTOR

FIELD OF THE INVENTION

The present invention relates to a complex bearing apparatus that incorporates a radial hydrodynamic bearing and an axial magnetic bearing. Also, the present invention relates to a spindle motor that incorporates the complex bearing assembly or mechanism.

BACKGROUND OF THE INVENTION

A complex bearing assembly or mechanism, which includes a hydrodynamic bearing for the radial support and a magnetic bearing for the axial support, has widely been employed as one component of a spindle motor for use in a magnetic memory device such as hard disc drive and a laser scanner for attaining a high-speed and high-precision rotation of the motor.

In this conventional complex bearing assembly, in particular a frictional wear at the radial dynamic bearing has been considered as a problematic matter that should be solved. Specifically, at the very beginning of the rotation of the motor in which the rotational speed of the motor has not been increased enough, the hydrodynamic pressure generated in the radial bearing is still small. Disadvantageously, this results in a continuous and/or discontinuous frictional contact in between a support member and a rotatably member supported for rotation, e.g., a fixed sleeve and a shaft inserted in the sleeve. Then, when the rotational speed of the motor is increased to a certain extent and, thereby, a rotational axis of the rotating member is stabled, the frictional contact between the support and rotatable members will come to an end.

As is known in the art, the frictional contact results in a frictional wear that decreases a durability of the spindle motor. The frictional wear depends upon the transitional rotational speed at which the frictional contact between the shaft and the sleeve comes to an end. That is, the frictional wear increases in proportion to the transitional rotational speed. This in turn means that, in order to attain a highly reliable bearing assembly and spindle motor having such bearing assembly, the transitional rotational speed is required to be minimized.

In the meantime, in the complex bearing assembly in which the shaft is extended vertically, a load or gravity of a rotational portion or rotor of the bearing assembly acts on the axial bearing and a centrifugal force caused by an unbalanced force of the rotor acts on the radial bearing. Also, no static force acts in a certain direction on the radial bearing, which in turn means that a portion where the radial bearing receives the centrifugal force moves with the rotation of the rotor.

Therefore, when the rotor rotates at a relatively low speed, the centrifugal force due to the unbalanced force of the rotor is greater than the hydrodynamic force derived in the radial bearing, which allows the sleeve to contact with the shaft. The contact portion between the shaft and sleeve moves around the shaft continuously. If the contact could be retained until a relatively high rotational speed of rotor, an increased contact force or energy consumption between the contacting rotor and shaft will provide a significant wear or damage to both rotor and shaft.

A most effective way to solve those problems is to increase the hydrodynamic force at the lower rotational speed of the rotor. In general, the hydrodynamic force changes according to diameter, length, and eccentricity of the bearing members and clearance between opposing sleeve and shaft. Specifically, the hydrodynamic force increases with the increase of diameter and length and the with the decrease of the clearance. The increase of the diameter and length results in an increase of the size of the motor and a system incorporating the motor, which fails to meet the current tendency of a compactness of the device. Also, a reduction in clearance requires a significant precision for the manufacturing of the shaft and sleeve. Further, the eccentricity, which is determined by the unbalanced mass, can not be controlled in practice.

On the other hand, the increase of diameter, length, or the decrease of clearance may result in a great increase of the rotational friction or resistance, which gives rise to an increase of power consumption by the motor that incorporates such bearing. In addition, the conventional hydrodynamic bearing, which changes its performance with the temperature at use, decreases its threshold rotational number for an instability such as half frequency whirl.

SUMMARY OF THE INVENTION

Accordingly, a complex bearing assembly as well as a spindle motor incorporating the complex bearing assembly of the present invention includes a base member, a first cylindrical member having a cylindrical outer periphery defined therein, and a second cylindrical member having a cylindrical inner periphery defined therein. The inner periphery has a greater diameter than that of the outer periphery of the first member so that the outer periphery of the first member is positioned in the inner periphery of the second member. Also, one of the first and second cylindrical members is fixed to the base member so that the other of the first and second cylindrical members rotates relative to the fixed member.

The assembly includes a radial bearing formed by the inner and outer peripheries. The radial bearing allows the rotatable cylindrical member to be supported between inner and outer peripheries in a radial direction relative to the fixed cylindrical member by means of a hydrodynamic force generated in a rotational movement of the rotatable cylindrical member. The assembly further includes an axial bearing. The axial bearing has a first magnetic member secured on the rotatable cylindrical member and extended around a rotational axis of the bearing assembly, and a second magnetic member secured on the fixed cylindrical member and extended around the first magnetic members while leaving a space therebetween. This causes the first and second magnetic members to cooperate to generate a magnetic force therebetween for supporting the rotatable member in an axial direction relative to the fixed cylindrical member. In particular, one of the first and second magnetic member is positioned in a coaxial fashion with the rotational axis of the bearing assembly and the other of the first and second magnetic member is positioned in an eccentric fashion with the rotational axis of the bearing assembly.

Also, a process for manufacturing the complex bearing assembly has providing an assembled complex bearing assembly. The complex bearing assembly includes a first member and a second member supported for rotation relative to the first member by radial and axial bearings. In particular, the process further includes measuring a rotational number of the second member at which the second member, after it is started rotating, becomes to lose frictional contacts with the first member.

DETAILED DESCRIPTION OF THE PREFERRED EMBODIMENTS

With reference to the drawings, descriptions will be made to several embodiments of the present invention. It should be noted that like numerals indicate like parts or portions throughout the drawings.

First Embodiment

Figure 1:
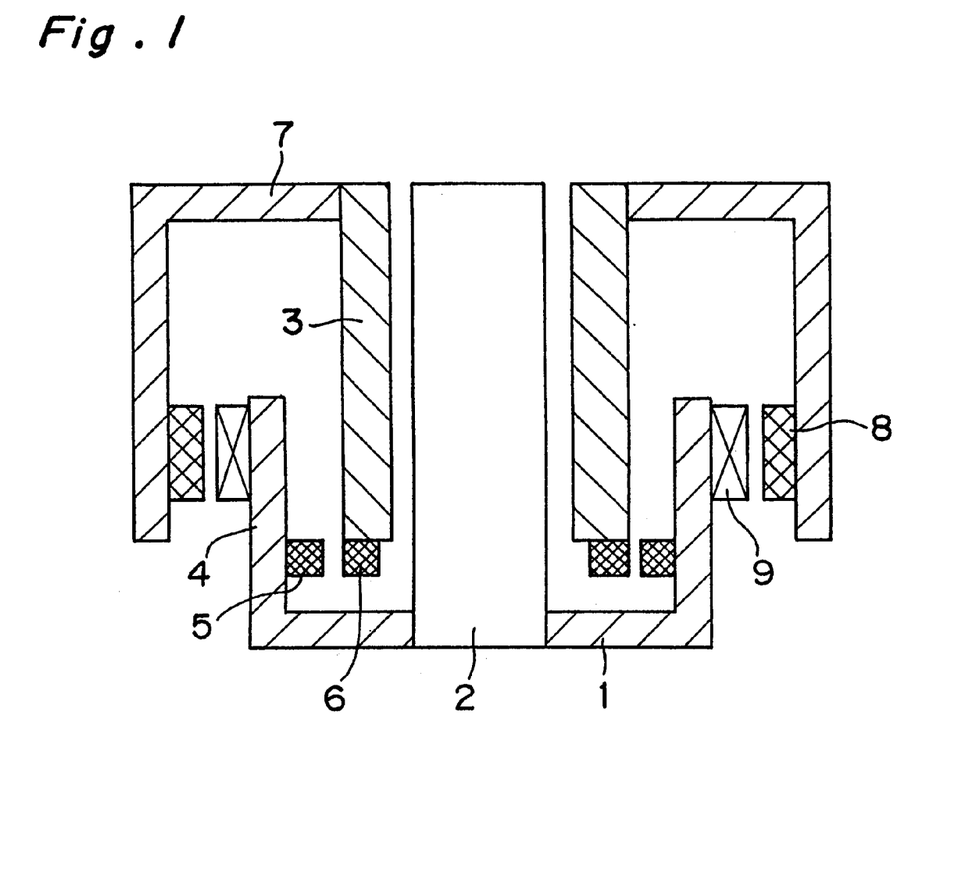
FIG. 1 is a schematic cross sectional view of a spindle incorporating a complex bearing assembly according to the first embodiment of the present invention.

Referring first to FIG. 1, a complex bearing assembly or structure according to the first embodiment of the present invention is illustrated. Generally, the complex bearing assembly includes a radial hydrodynamic bearing and an axial magnetic bearing. Specifically, the complex bearing assembly has a base member or fixed housing 1. The housing 1 supports a vertical shaft 2. Also, a hollow cylindrical sleeve 3 is positioned around the shaft 2 so that it can rotate around the shaft 2, thereby forming a radial hydrodynamic bearing between the shaft 2 and the sleeve 3.

The housing 1 includes a hollow cylindrical portion 4 spaced apart from and positioned around the sleeve 3. A permanent magnet 5 or magnetic ring is secured on and along an inner surface of the cylindrical portion 4. Another permanent magnet 6 or magnetic ring is secured on and along a bottom portion of the sleeve 3 so that it opposes radially to the permanent magnet 5.

Figure 2:
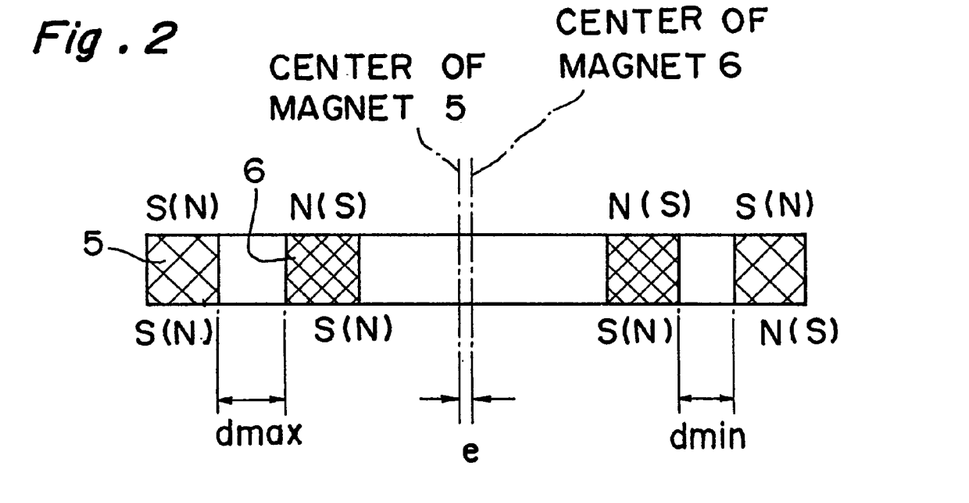
FIG. 2 is a schematic cross sectional views of magnet s showing an eccentric arrangement of the magnet.

Referring to FIG. 2, the magnets 5 and 6 are magnetized in an axial direction thereof so that they attract each other, thereby forming an axial bearing. Specifically, in this embodiment, the outer magnet 5 is provided at its top and bottom surface with South and North poles, respectively, and the inner magnet 6 is provided at its top and bottom surface with North and South poles, respectively.

In particular, the outer and inner magnets, 5 and 6, are positioned so that, when the shaft 2 and sleeve 3 are positioned in a coaxial relationship, the inner magnet 6 stays in a coaxial fashion with the shaft 2 and sleeve 3 but the outer magnet 5 stays eccentrically to the shaft 2 and sleeve. Preferably, the eccentricity (indicated by alphabet "e" in FIG. 2) is determined so that a ratio of the eccentricity (i.e., e) to a mean gap (i.e., $d_{mean}$) defined by the following equation (1) ranges about 0.01 to 0.3, more preferably 0.02 to 0.1.

$$d_{mean} = \frac{d_{max} + d_{min}}{2} \quad (1)$$

$d_{max}$: Maximum gap between shaft and sleeve
$d_{min}$: Minimum gap between shaft and sleeve In this embodiment, the eccentricity is provided simply by positioning the outer magnet 5 eccentrically by the use of, for example, a spacing member not shown extending around the outer magnet 5 and between the outer magnet 5 and the cylindrical portion 4. Alternatively, the eccentricity may be provided simply by securing the outer magnet 5 in an eccentric fashion with the cylindrical portion 4 by the use of suitable adhesive.

In addition, the rotor 3 carries a rotor 7 having a horizontal portion extending outwardly from the sleeve 3 and a vertical portion (hollow cylindrical portion) extending downwardly from the horizontal portion. Also, the rotor 7 is designed so that the vertical portion defines a cylindrical gap around the cylindrical portion 4 of the housing 1. The vertical portion of the rotor 7 carries a rotor magnet 8 or magnetic ring arranged along its inner peripheral surface of the vertical portion. The cylindrical portion 4, on the other hand, carries a stator coil 9 around its outer peripheral surface. The stator coil 9 is electrically connected with an AC power supply not shown so that it can be applied with an AC electric power to rotate the rotor 7 as well as sleeve 3 around the shaft 2.

In operation of the complex bearing assembly so constructed, the AC power is supplied to the stator coil 9. This results in a change in the magnetic field between the stator coil 9 and the rotor magnet 8, allowing the rotor 7 and the sleeve 3 to rotate around the shaft 2 in a predetermined direction. The rotation gives rise to a hydrodynamic force in a hydrodynamic bearing chamber between the shaft 2 and the sleeve 3, which forms a positive and constant gap therebetween. In the vertical direction, the rotating sleeve 3 is kept in position relative to the housing 1 and in a spaced fashion from the housing 1, due to the magnetic attraction force generated between the opposed permanent magnets 5 and 6 mounted on the housing 1 and sleeve 3, respectively. In view of above, the rotating sleeve 3 and rotor 7 is retained around the shaft 2 without any frictional contact with fixed portions.

In particular, since in the axial bearing the magnet 5 is eccentrically arranged in the radial direction relative to the axes of the shaft 2 and sleeve 3, the rotating sleeve 3 is magnetically forced to a certain direction, e.g., from left to right in FIG. 2. Also, as described above, the hydrodynamic force increases with the decrease of the gap between the shaft 2 and the sleeve 3. Therefore, the eccentricity of the magnet 5 generates a greater hydrodynamic force at the minimum gap portion between the shaft 2 and the sleeve 3. Also, since the eccentric magnet 5 is fixed in position, the rotating sleeve 3 is always forced toward the eccentric direction. This results in that, even when the sleeve 3 rotates in a relatively lower speed, it is forced to the direction, generating a greater hydrodynamic force between the sleeve 3 and the shaft 2. This in turn ensures that the sleeve 3 becomes to lose frictional contact with the shaft 2 at lower rotational speed of the sleeve 3, reducing the wear of both shaft 2 and the sleeve 3 due to the frictional contact caused therebetween.

As described above, according to the first embodiment of the complex bearing assembly, the eccentrically arranged magnet in the axial bearing provides the rotor with the eccentric force in one radial direction and thereby generates the increased hydrodynamic force between the sleeve and the shaft, allowing the rotor to be retained in a stable condition even in the reduced rotational speed of the rotor. This in turn reduces the rotational speed of the rotor at which the rotor becomes to lose frictional contacts with the shaft, also reducing the wears of the sleeve and the shaft.

It is to be understood that the eccentricity of the magnet should be determined carefully, i.e., in the range as described above. This is because the smaller eccentricity generates a less eccentric force and, on the other hand, the greater eccentricity creates an excessive eccentric force, both of which increases the rotational number or rotational frequency at which the rotating sleeve becomes to lose frictional contacts with the shaft Second Embodiment Referring next to FIG. 3, there is shown a second embodiment of the complex bearing assembly for use with the spindle motor, for example. The complex bearing assembly includes a securely supported stator or housing 11 in the form of hollow cylinder. A sleeve 12 in the form of hollow cylinder is securely held in the cylindrical housing 11 in a coaxial fashion. A shaft 12 is inserted and positioned in the sleeve for rotation about its longitudinal axis. The shaft 12 bears a rotor 17 having a horizontal portion or disc extending outwardly from one end of the shaft 12 and beyond the sleeve 18. The horizontal portion in turn supports a vertical portion extending downwardly from a peripheral edge of the horizontal portion so that the vertical portion surrounds around and spaces away from the cylindrical housing 11, leaving a certain gap therebetween. The vertical portion of the rotor 17 carries a rotor magnet 8 or magnet ring extending around and along the inner peripheral surface of the vertical portion. Corresponding to the rotor magnet 8, an associated stator coil 9 is securely provided on and around an outer peripheral surface of the cylindrical housing 11 so that it opposes to and spaces away from the rotor magnet 8.

Figure 3:
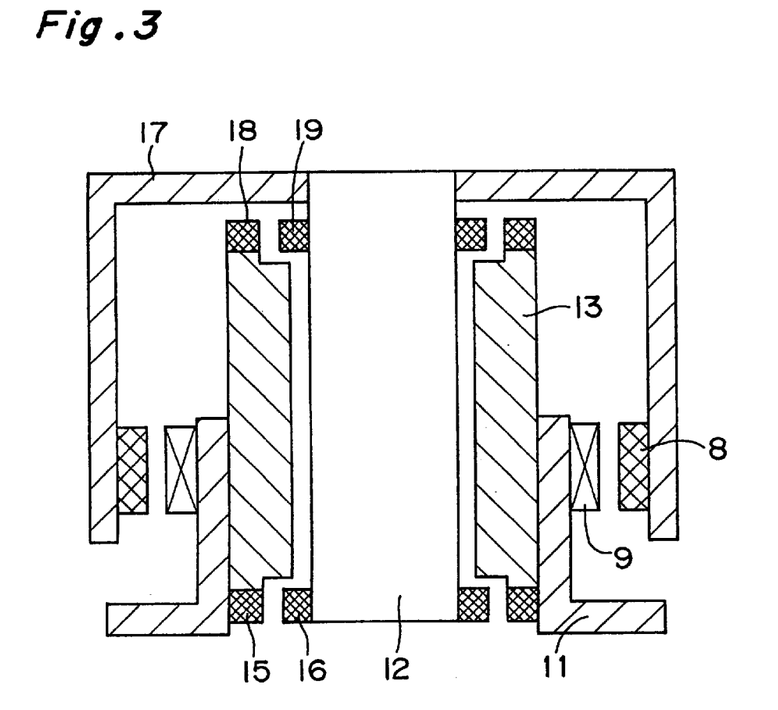
FIG. 3 is a schematic cross sectional view of a spindle motor incorporating another complex bearing assembly according to the second embodiment of the present invention.

Also, a magnet 15 or magnet ring is securely provided around the inner peripheral surface of the housing 11 and at the bottom end of the cylindrical sleeve 13 so that it faces to a portion, e.g., lower end surface of the shaft 12. The shaft 13, on the other hand, holds an associated magnet 16 or magnet ring so that the magnets 15 and 16 opposes to each other while leaving a certain gap therebetween. In particular, similar to the first embodiment, the inner magnet 16 is positioned in a coaxial fashion with the shaft 13. Contrary to this, the outer magnet 15 is positioned out of coaxial fashion with the sleeve 13 simply by, for example, arranging an eccentric spacer or ring between the magnet 15 and the cylindrical housing 11.

In operation of the complex bearing assembly according to the second embodiment, an AC power is supplied to the stator coil 9, causing the rotor 17 and the shaft 12 to rotate about a longitudinal axis of the shaft 12 in a predetermined direction. Also, the rotation gives rise to a hydrodynamic force in a hydrodynamic bearing chamber between the shaft 2 and the sleeve 3, which forms a positive and constant gap therebetween. In the vertical direction, the rotating sleeve 13 is kept in position relative to the housing 11 and in a spaced fashion from the housing 11, due to the magnetic attraction force generated between the opposed permanent magnets 5 and 6 mounted on the housing 11 and sleeve 13, respectively. In particular, the eccentrically arranged magnets, 5 and 6, provide the rotor with the eccentric force in one radial direction and thereby generate the increased hydrodynamic force between the sleeve and the shaft. This allows the rotor to be retained in a stable condition even at the reduced rotational speed of the rotor. This in turn reduces the rotational speed of the rotor at which the rotor becomes to lose frictional contacts with the shaft, also reducing the wears of the sleeve and the shaft.

As shown in FIG. 3, another pair of magnets, 18 and 19, or magnet rings may be provided on the opposite side, i.e., top end, of the sleeve 13 and shaft 12. In this instance, the upper magnets 18 and 19 should be positioned as the lower magnets 15 and 16 so that the eccentric force generated between the upper magnets 18 and 19 directs in the same direction as that between the lower magnets 15 and 16. Also, the upper magnets 18 and 19 may be magnetized as the lower magnets 15 and 16 as shown in FIG. 2 or may be magnetized oppositely as shown in parentheses in FIG. 2.

With this arrangement, the rotating shaft 12 is supported at it opposite ends and eccentrically forced in the same direction, ensuring a stable rotation of the shaft 12 and also a quick losing of the frictional contact with the sleeve 13.

It should be noted that any one of the paired permanent magnets or magnet rings may be replaced by a magnetic member made of silicic material, for example.

Third Embodiment

Prior to a specific description of the third embodiment according to the present invention, a description will be made to an influence of transformations in the peripheral surfaces defining the radial bearing to the rotational stability of the rotational member.

Figure 4:
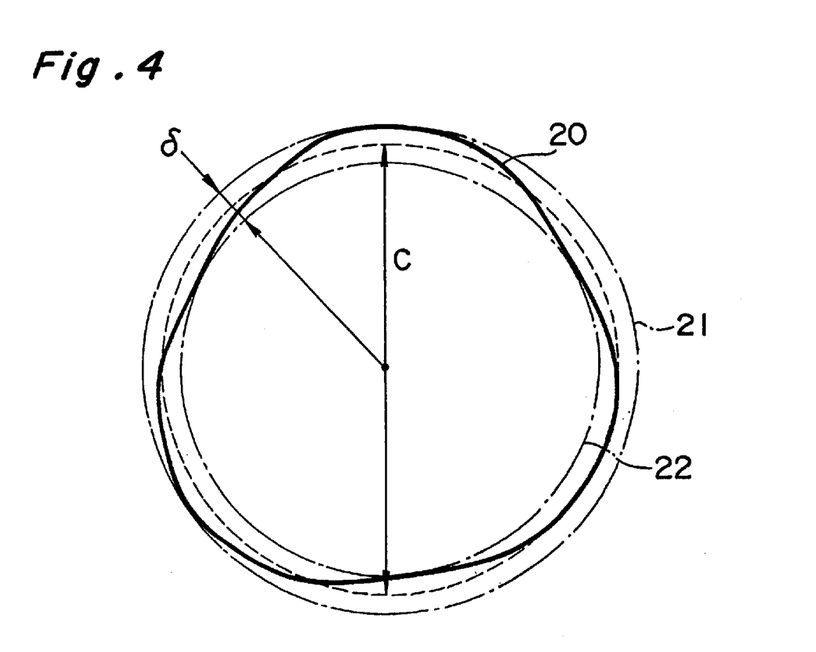
FIG. 4 shows a closed loop tracking around the shaft or sleeve in an exaggerated fashion and coaxially arranged minimum circumscribed and maximum inscribed circles for the closed loop.

Referring to FIG. 4, there is shown a closed loop 20 formed by tracking an outer periphery of the shaft or an inner periphery of the sleeve in an exaggerated fashion. Also, circles 21 and 22, which are positioned in a coaxial fashion, are circumscribed and inscribed circles, 21 and 22, touching the closed loop externally and internally with minimum and maximum diameters, respectively. Also, in FIG. 4, a difference of radii of the circumscribed and inscribed circles, 21 and 22, is indicated by "δ", and a mean diameter of the circumscribed and inscribed circles, 21 and 22, is indicated by "C". It should be noted that grooves or recesses formed in the peripheral surface of the sleeve and/or shaft for increasing the hydrodynamic force or unwanted scratches made at the machining of the shaft and/or sleeve are not taken into consideration for the closed loop.

Inventors of the present invention made a number of tests for samples having different values of parameters, i.e., "δ", "C", and out of roundness defined as "δ/C". As a result, it has found that the out of roundness should be less than $1 \times 10^{-4}$, preferably less that $7-10^{-5}$, in order to prevent the whirl which would otherwise be caused at the high speed rotation, without any need to form grooves or recesses in the periphery of the sleeve and/or shaft. This is because the complex bearing assembly in which the rotational portion is biased to one radial direction generates a greater hydrodynamic force, which ensures a quick adjustment or recovering of the rotational center even when the rotational member is subjected to an accidental shock or external force.

Fourth Embodiment

Next, descriptions will be made to specific construction of the complex bearing assembly according to the fourth embodiment. Also, this embodiment addresses to an improvement on the shaft and/or sleeve forming the hydrodynamic bearing in which grooves are formed in the peripheral surface or surfaces thereof for increasing the hydrodynamic force generated in the bearing. As is known in the art, the hydrodynamic force can be increased by the grooves formed in the opposing surfaces. This is because the grooves draw air into the bearing chamber and thereby increasing the hydrodynamic force therein. Then, it is expected that the shaft will lose frictional contacts with the shaft at the reduced rotational speed. In addition, the grooves increase the rotational number at which the half-whirl would occur, which in turn means that the rotational movement of the rotational member is stabled at greater rotational number.

Figure 5A:
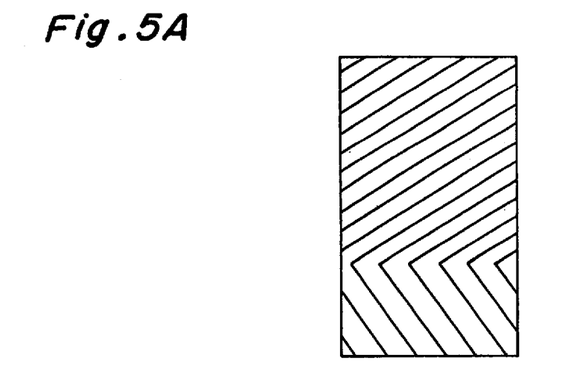
FIGS. 5A to 5C show appearances of sleeve and/or shaft.
Figure 5B:
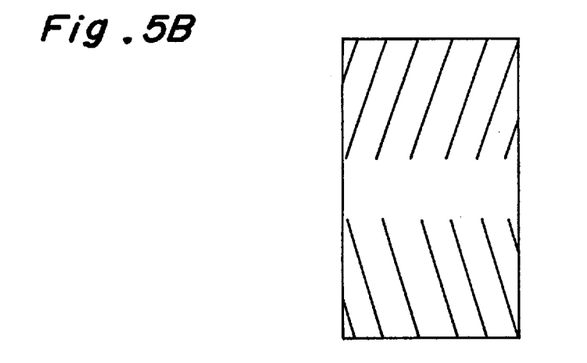
Figure 5C:
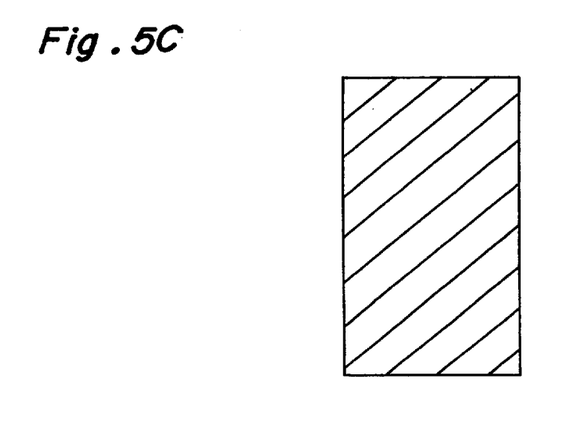

FIGS. 5A to 5C schematically show grooves, i.e., herringbone grooves (FIGS. 5A and 5B) and helical grooves (FIG. 5C), formed in the peripheral surface of the shaft and/or sleeve. The arrangement of the grooves is not limited thereto and it may be modified provided that it can increase the hydrodynamic force in the hydrodynamic bearing.

Preferably, even if the sleeve and the shaft are arranged in the coaxial fashion, they define at least one enlarged gap portion having a greater gap than remaining portions between the opposing inner and outer peripheries thereof and, further, the enlarged gap portion extends about 40% or more of the longitudinal length of the bearing. In this instance, the half-whirl can effectively be prevented even at higher rotational number compared with that with herringbone grooves. In this regard, it has been found from many tests, which will be described hereinafter as Example 3, preferably the enlarged gap portion has a size of less than ten times that of the average gap, and the angle of the peripheral length of the enlarged gap portion ranges from about 3 to 90 degrees.

Fifth Embodiment

Descriptions will be made to the fifth embodiment of the present invention which addresses to an improvement on the material of the shaft and sleeve. Specifically, it is preferable that a difference in coefficient of thermal expansion between materials of the sleeve and the shaft ($\Delta\alpha$) is $8 \times 10^{-6}/°$ C. or less and a difference in coefficient of elasticity of the rotational member is $2.5 \times 10^4$ kgf/mm$^2$ or more. From tests, it has been determined that by the use of such materials the stability of the complex bearing assembly at higher rotational speed is increased.

In the meantime, the half-whirl may occur at the temperature from about $-30$ to $60°$ C. because of an expansion of the gap adjusted at room temperature and thereby a reduction in stability for half-whirl. The complex bearing assembly of the present invention, on the other hand, the eccentric arrangement in the axial bearing retains an effective gap between the sleeve and the shaft even at high temperature by the above-mentioned selection of the materials for the sleeve and the shaft. This provides the complex bearing with the predetermined performance.

Also, simply by selecting material as described above for the rotational member, i.e., sleeve or shaft, the eccentric effect in the axial bearing can be attained positively. This in turn minimizes the displacement of the shaft and, thereby, even at high rotational speed, e.g., 10,000 rpm or more, a stable rotation can be attained with high precision.

Further, preferably either or both of the shaft and the sleeve may be made of ceramic. The ceramic that has a high stiffness and wear resistance with the above-mentioned elasticity can easily be selected. Also, the ceramic provides less wear to other materials that contact with it. Therefore, the ceramic effectively resists against the frictional contact with the associate member in the radial bearing which would occur at lower rotational speed, especially at start and stop operations, due in part to the eccentric arrangement in the axial bearing. Several ceramics including aluminum ceramic, silicon nitride ceramic, and silicon carbide ceramic are preferably used.

Sixth Embodiment

Descriptions will be made to the sixth embodiment of the present invention which addresses to an improvement on a manufacturing process for the spindle motor, which includes a step for measuring a rotational number at which the rotational member becomes to lose frictional contacts with the associated fixed member (referred to as "maximum contact rotational number" or "MCRN" for clarity). As described above, the increased MCRN considerably deteriorates a durability of the bearing assembly due to the frictional contact between the sleeve and the shaft. Therefore, MCRN should be measured in the process of manufacturing of the spindle motor before its shipping.

Figure 6:
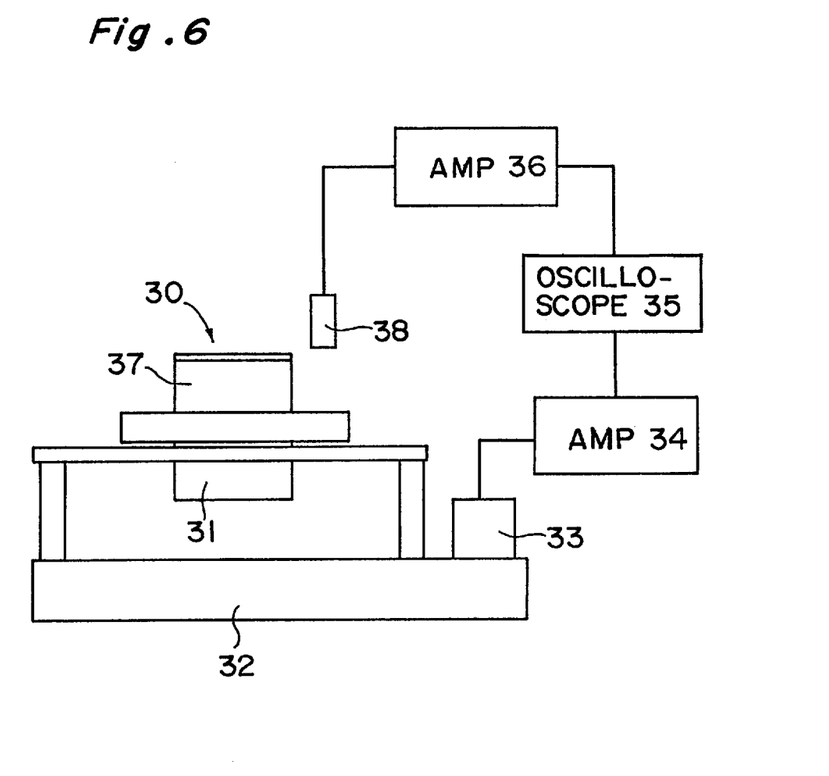
FIG. 6 a schematic side elevational view of a device for measuring the rotational number of the motor at which the rotatable member becomes to lose frictional contacts with the adjacent fixed member.

Referring to FIG. 6, there is shown a system for measuring MCRN in the spindle motor according to the embodiment of the present invention. In this drawing, the spindle motor 30 including the complex bearing assembly is fixed through its housing 31 on a fixed support 32. The support 32 bears a pickup device 33 for picking up vibrations of the support 32. The pickup device 33 is in turn connected through an amplifier 34 with an oscilloscope 35. A sensor 38 for detecting the rotation of the rotational member or rotor in the spindle motor 30 is electrically connected through another amplifier 36 with the oscilloscope 35.

Figure 7:
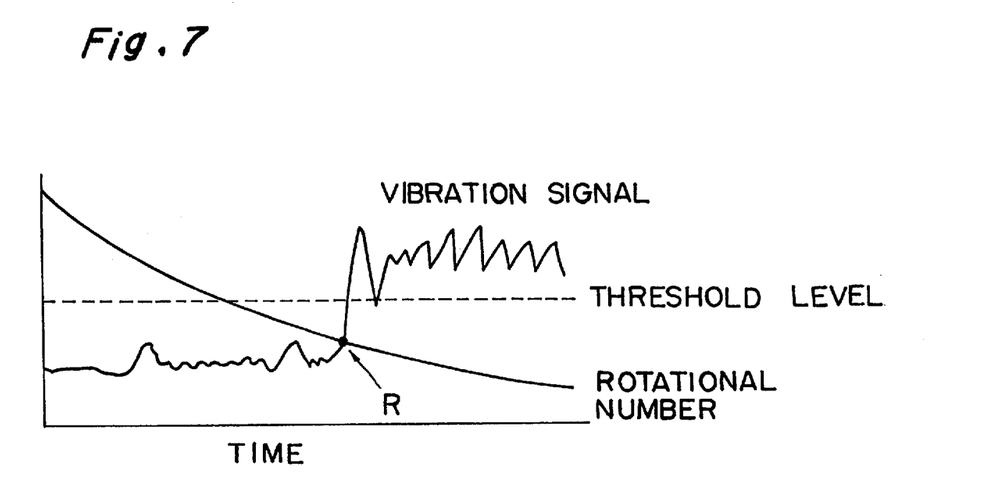
FIG. 7 is a graph showing variations of the rotational number and a signal waveform indicating vibrations generated in the motor.

In operation for detecting MCRN, first the spindle-motor 30 is energized to rotate the rotor 37 by the use of electric power or fluid flow (i.e., air pressure). Then, once the rotational number of the rotor 37 reaches 5,000 rpm, the spindle motor 30 is de-energized, from which the rotational number of the rotor 37 begins to decrease. During operation, the pickup device 33 picks up the vibration of the support 32 and the sensor 38 detects the rotational number of the rotor 37. The outputs of the pickup device 33 and the sensor 38 are amplified by respective amplifiers 34 and 36 and then fed into the oscilloscope 35. The oscilloscope 35 monitors the vibration and rotational number and detects an drastic increase in the rotational number as MCRN. FIG. 7 shows the changes of the rotational number and vibration level detected. In this drawing, MCRN is indicated at "R".

By using such system, MCRN can be determined for each spindle motor and, if the product fails to have a predetermined MCRN, it can be prevented from being shipped, which ensures the products with a certain MCRN to be provided to users.

Experiment 1

Tests were made to the complex bearing assembly in light of durability and half-whirl. In tests, the shaft and sleeve made from respective sintered alumina members were used. In particular, each shaft was grounded at its outer surface portion opposing to the sleeve so that it has a surface roughness Ry of 5 $\mu$m or less and Sm of 100 $\mu$m or less. Also, each sleeve was ground at its inner surface portion opposing to the shaft so that it has a surface roughness Ry of 5 $\mu$m or less and Sm of 10 $\mu$m or less. The out of roundness of the shafts were measured.

In the complex bearing assembly tested, having a structure shown in FIG. 1, the magnet 6 is bonded on the sleeve 3 using adhesive. Also, the magnet 5 was fixed on the vertical hollow portion 4 of the housing 1 in the eccentric fashion against the shaft 2.

The rotor is balanced with a balanced level of G1 class according to Japanese Industrial Standard (JIS) B-0905.

MCRN was detected as described above. Half-whirl was detected by suspending the motor from a fixed frame, detecting vibrations from the motor by vibration pickup device, processing output signal from the pickup device using First Fourier Transform (FFT), and determining the existence of peak at the frequency corresponding to the half of the rotational number.

The durability of the motor was determined by repeating an energizing and de-energizing cycle in which the motor was energized and then de-energized after the rotational number has reached to a predetermined number (50,000 rpm) to halt the motor. In this test, the rotating member makes frictional contacts with the fixed member when the rotational number decreases to MCRN, which allows the durability of the motor can be evaluated.

The test results are indicated in the following table 1. In this table, a superscript "*" indicates comparative example. Also, in the column for half-whirl, "N" (i.e., Not good) means that half-whirl was detected and "—" (i.e., Good) means that half-whirl was not detected.

As can be seen from table 1, according to the present invention MCRN can be reduced without any need to change the dimensions of the parts in the bearing assembly or the gap between the sleeve and the shaft, which increases the wear resistance of the bearing assembly.

TABLE 1

| NO. | X1 | X2 | X3 | X4 | X5 |
|---|---|---|---|---|---|
| *1 | 2.5E-5 | 0.008 | 1,500 | 150,000 | N |
| 2 | | 0.01 | 420 | ≧1000,000 | — |
| 3 | | 0.3 | 580 | ≧1000,000 | — |
| *4 | | 0.5 | 2,000 | 120,000 | N |
| *5 | 6.5E-5 | 0.008 | 1,700 | 40,000 | N |
| 6 | | 0.01 | 500 | ≧1000,000 | — |
| 7 | | 0.3 | 600 | ≧1000,000 | — |
| *8 | | 0.5 | 1,800 | 60,000 | N |
| *9 | 1E-4 | 0.008 | 2,500 | 30,000 | — |
| 10 | | 0.01 | 2,800 | 40,000 | — |
| 11 | | 0.3 | 2,600 | 20,000 | — |
| 12 | | 0.5 | 3,200 | 20,000 | — |

X1: Out of roundness (×$10^6$)
X2: Eccentricity
X3: MCRN (rpm)
X4: Durability (Cycled number)
X5: Half-whirl

Experiment 2

For bearing assemblies in each of which herringbone grooves were formed on the outer peripheral surface of the shaft, tests were made with respect to MCRN, durability, and formation of half whirl. The results are shown in Table 2, which indicates that, due to the eccentric force caused by the eccentrically arranged magnet, the bearing assembly with herringbone grooves allows the rotating member to lose frictional contacts with the fixed member at a reduced rotational number, compared with shaft with complete circle. This increases both the durability of the bearing and the rotational number at which the half-whirl becomes to appear, improving the performance of the bearing at high speed rotation.

TABLE 2

| NO. | X1 | X2 | X3 | X4 | X5 |
|---|---|---|---|---|---|
| *1 | 2.5E-5 | 0.008 | 1,650 | 90,000 | — |
| 2 | | 0.01 | 300 | ≧1000,000 | — |
| 3 | | 0.3 | 370 | ≧1000,000 | — |
| *4 | | 0.5 | 2,100 | 60,000 | — |
| *5 | 6.5E-5 | 0.008 | 1,550 | 50,000 | — |
| 6 | | 0.01 | 320 | ≧1000,000 | — |
| 7 | | 0.3 | 410 | ≧1000,000 | — |
| *8 | | 0.5 | 2,400 | 60,000 | — |
| *9 | 1E-4 | 0.008 | 1,780 | 20,000 | N |
| 10 | | 0.01 | 450 | ≧1000,000 | — |

TABLE 2-continued

| NO. | X1 | X2 | X3 | X4 | X5 |
|---|---|---|---|---|---|
| 11 | | 0.3 | 510 | ≧1000,000 | — |
| *12 | | 0.5 | 2,300 | 30,000 | N |

X1: Out of roundness (×$10^6$)
X2: Eccentricity
X3: MCRN (rpm)
X4: Durability (Cycled number)
X5: Half-whirl

Experiment 3

Tests were made to evaluate the effect by the formation of the enlarged gap portion or portions in the radial bearing. The enlarged gap portion of each bearing was extended longitudinally. The plural enlarged gap portions were arranged at regular intervals. The test results are shown in Tables 3-1 and 3-2.

TABLE 3-1

| NO. | X1 | X2 | X3 | X4 | X5 | X6 | X7 |
|---|---|---|---|---|---|---|---|
| *1 | 1 | 5 | 15 | 0.008 | N | 1,800 | 30,000 |
| 2 | | | | 0.01 | — | 320 | ≧1000,000 |
| 3 | | | | 0.3 | — | 340 | ≧1000,000 |
| *4 | | | | 0.5 | N | 2,100 | 40,000 |
| 5 | 1 | 8 | 15 | 0.008 | N | 2,200 | 40,000 |
| 6 | | | | 0.01 | — | 410 | ≧1000,000 |
| 7 | | | | 0.3 | — | 390 | ≧1000,000 |
| *8 | | | | 0.5 | N | 2,100 | 50,000 |
| *9 | 1 | 10 | 15 | 0.08 | N | 2,500 | 30,000 |
| 10 | | | | 0.01 | N | 2,200 | 40,000 |
| 11 | | | | 0.3 | N | 1,900 | 30,000 |
| *12 | | | | 0.5 | N | 3,200 | 5,000 |
| *13 | 3 | 5 | 15 | 0.008 | — | 1,600 | 100,000 |
| 14 | | | | 0.01 | — | 270 | ≧1000,000 |
| 15 | | | | 0.3 | — | 230 | ≧1000,000 |
| *16 | | | | 0.5 | — | 1,800 | 100,000 |
| *17 | 3 | 8 | 15 | 0.008 | — | 2,300 | 150,000 |
| 18 | | | | 0.01 | — | 340 | ≧1000,000 |
| 19 | | | | 0.3 | — | 360 | ≧1000,000 |
| *20 | | | | 0.5 | — | 2,600 | 120,000 |
| *21 | 3 | 10 | 15 | 0.008 | N | 1,800 | 30,000 |
| 22 | | | | 0.01 | N | 2,100 | 20,000 |
| 23 | | | | 0.3 | N | 2,400 | 40,000 |
| *24 | | | | 0.5 | N | 2,800 | 30,000 |

TABLE 3-2

| NO. | X1 | X2 | X3 | X4 | X5 | X6 | X7 |
|---|---|---|---|---|---|---|---|
| *25 | 3 | 5 | 60 | 0.008 | — | 1,700 | 80,000 |
| 26 | | | | 0.01 | — | 180 | ≧1000,000 |
| 27 | | | | 0.3 | — | 160 | ≧1000,000 |
| *28 | | | | 0.5 | — | 2,200 | 100,000 |
| 29 | 3 | 5 | 2 | 0.008 | N | 3,000 | 10,000 |
| 30 | | | | 0.01 | — | 1,800 | 20,000 |
| 31 | | | | 0.3 | — | 2,000 | 20,000 |
| *32 | | | | 0.5 | N | 2,600 | 30,000 |
| *33 | 3 | 5 | 3 | 0.08 | N | 2,300 | 100,000 |
| 34 | | | | 0.01 | — | 360 | ≧1000,000 |
| 35 | | | | 0.3 | — | 330 | ≧1000,000 |
| *36 | | | | 0.5 | N | 2,500 | 100,000 |
| *37 | 3 | 5 | 90 | 0.008 | N | 2,100 | 100,000 |
| 37 | | | | 0.01 | — | 250 | ≧1000,000 |
| 39 | | | | 0.3 | — | 230 | ≧1000,000 |
| *40 | | | | 0.5 | N | 2,400 | 100,000 |
| *41 | 3 | 5 | 100 | 0.008 | N | 3,000 | 20,000 |
| 42 | | | | 0.01 | N | 2,200 | 30,000 |

TABLE 3-2-continued

| NO. | X1 | X2 | X3 | X4 | X5 | X6 | X7 |
|---|---|---|---|---|---|---|---|
| 43 | | | | 0.3 | N | 2,400 | 20,000 |
| *44 | | | | 0.5 | N | 2,800 | 10,000 |

X1: Number of portion(s) where gap is enlarged
X2: Enlarged gap/Average gap
X3: Central angle of enlarged portion (degrees)
X4: Eccentricity
X5: Half-whirl
X6: MCRN (rpm)
X7: Durability (Cycled number)

Experiment 4

For three types of bearings with different material, eccentricities, and bearing surfaces (i.e., without groove (complete circle), with herringbone grooves, and with vertical grooves), tests were made with respect to formation of half whirl. The bearings, each including a rotor with a certain mass, were used. The results were shown in Tables 4-1 to 4-3.

TABLE 4-1

| | Elasticity | | | | Without groove | | Herrigbone grooves | | Vertical grooves | |
|---|---|---|---|---|---|---|---|---|---|---|
| | Sleeve ($\times 10^4$ | Shaft ($\times 10^4$ | $\Delta \alpha$ ($8 \times 10^6$/ | Eccen- | | | | | | |
| No. | kg/mm$^2$) | kg/mm$^2$) | °C.) | tricity | 20° C. | 60° C. | 20° C. | 60° C. | 20° C. | 60° C. |
| *1-1 | 2.0 | 2.0 | 0 | 0.008 | N | N | N | N | N | N |
| 1-2 | | | | 0.01 | — | N | — | N | — | N |
| 1-3 | | | | 0.3 | — | N | — | N | — | N |
| *1-4 | | | | 0.5 | N | N | N | N | N | N |
| *2-1 | 2.0 | 2.0 | 8 | 0.008 | N | N | N | N | N | N |
| 2-2 | | | | 0.01 | — | N | — | N | — | N |
| 2-3 | | | | 0.3 | — | N | — | N | — | N |
| *2-4 | | | | 0.5 | N | N | N | N | N | N |
| *3-1 | 2.0 | 2.0 | 8 | 0.008 | N | N | N | N | N | N |
| 3-2 | | | | 0.01 | — | N | — | N | — | N |
| 3-3 | | | | 0.3 | — | N | — | N | — | N |
| *3-4 | | | | 0.5 | N | N | N | N | N | N |
| *4-1 | 2.0 | 2.0 | 0 | 0.008 | N | N | N | N | N | N |
| 4-2 | | | | 0.01 | — | N | — | N | — | N |
| 4-3 | | | | 0.3 | — | N | — | N | — | N |
| *4-4 | | | | 0.5 | N | N | N | N | N | N |
| *5-1 | 2.0 | 3.5 | 10 | 0.008 | N | N | N | N | N | N |
| 5-2 | | | | 0.01 | — | N | — | N | — | N |
| 5-3 | | | | 0.3 | — | N | — | N | — | N |
| *5-4 | | | | 0.5 | N | N | N | N | N | N |
| *6-1 | 3.5 | 2.0 | 10 | 0.008 | N | N | N | N | N | N |
| 6-2 | | | | 0.01 | — | N | — | N | — | N |
| 6-3 | | | | 0.3 | — | N | — | N | — | N |
| *6-4 | | | | 0.5 | N | N | N | N | N | N |
| *7-1 | 3.5 | 3.5 | 0 | 0.008 | N | N | N | N | N | N |
| 7-2 | | | | 0.01 | — | — | — | — | — | — |
| 7-3 | | | | 0.3 | — | — | — | — | — | — |
| *7-4 | | | | 0.5 | N | N | N | N | N | N |
| *8-1 | 2.0 | 3.5 | 2 | 0.008 | N | N | N | N | N | N |
| 8-2 | | | | 0.01 | — | N | — | N | — | N |
| 8-3 | | | | 0.3 | — | N | — | N | — | N |
| *8-4 | | | | 0.5 | N | N | N | N | N | N |
| *9-1 | 3.5 | 2.0 | 2 | 0.008 | N | N | N | N | N | N |
| 9-2 | | | | 0.01 | — | — | — | — | — | — |
| 9-3 | | | | 0.3 | — | — | — | — | — | — |
| *9-4 | | | | 0.5 | N | N | N | N | N | N |

TABLE 4-2

| | Elasticity | | | | Without groove | | HerriNbone grooves | | Vertical grooves | |
|---|---|---|---|---|---|---|---|---|---|---|
| | Sleeve ($\times 10^4$ | Shaft ($\times 10^4$ | $\Delta \alpha$ ($8 \times 10^6$/ | Eccen- | | | | | | |
| No. | kg/mm$^2$) | kg/mm$^2$) | °C.) | tricity | 20° C. | 60° C. | 20° C. | 60° C. | 20° C. | 60° C. |
| *10-1 | 2.0 | 3.0 | 14.6 | 0.008 | N | N | N | N | N | N |
| 10-2 | | | | 0.01 | — | N | — | N | — | N |
| 10-3 | | | | 0.3 | — | N | — | N | — | N |
| *10-4 | | | | 0.5 | N | N | N | N | N | N |
| *11-1 | 2.0 | 2.0 | 14.6 | 0.008 | N | N | N | N | N | N |
| 11-2 | | | | 0.01 | — | N | — | N | — | N |

TABLE 4-2-continued

| | Elasticity | | | | Without groove | | HerriNbone grooves | | Vertical grooves | |
|---|---|---|---|---|---|---|---|---|---|---|
| No. | Sleeve (×10⁴ kg/mm²) | Shaft (×10⁴ kg/mm²) | Δα (8 × 10⁶/ °C.) | Eccentricity | 20° C. | 60° C. | 20° C. | 60° C. | 20° C. | 60° C. |
| 11-3 | | | | 0.3 | — | N | — | N | — | N |
| *11-4 | | | | 0.5 | N | N | N | N | N | N |
| *12-1 | 3.0 | 3.0 | 0 | 0.008 | N | N | N | N | N | N |
| 12-2 | | | | 0.01 | — | — | — | — | — | — |
| 12-3 | | | | 0.3 | — | — | — | — | — | — |
| *12-4 | | | | 0.5 | N | N | N | N | N | N |
| *13-1 | 2.0 | 3.0 | 6.6 | 0.008 | N | N | N | N | N | N |
| 13-2 | | | | 0.01 | — | N | — | N | — | N |
| 13-3 | | | | 0.3 | — | N | — | N | — | N |
| *13-4 | | | | 0.5 | N | N | N | N | N | N |
| *14-1 | 3.0 | 2.0 | 6.6 | 0.008 | N | N | N | N | N | N |
| 14-2 | | | | 0.01 | — | — | — | — | — | — |
| 14-3 | | | | 0.3 | — | — | — | — | — | — |
| *14-4 | | | | 0.5 | N | N | N | N | N | N |
| *15-1 | 2.0 | 4.0 | 13 | 0.008 | N | N | N | N | N | N |
| 15-2 | | | | 0.01 | — | N | — | N | — | N |
| 15-3 | | | | 0.3 | — | N | — | N | — | N |
| *15-4 | | | | 0.5 | N | N | N | N | N | N |
| *16-1 | 4.0 | 2.0 | 13 | 0.008 | N | N | N | N | N | N |
| 16-2 | | | | 0.01 | — | — | — | — | — | — |
| 16-3 | | | | 0.3 | — | — | — | — | — | — |
| *16-4 | | | | 0.5 | N | N | N | N | N | N |
| *17-1 | 2.0 | 4.0 | 5 | 0.008 | N | N | N | N | N | N |
| 17-2 | | | | 0.01 | — | — | — | — | — | — |
| 17-3 | | | | 0.3 | — | — | — | — | — | — |
| *17-4 | | | | 0.5 | N | N | N | N | N | N |
| *18-1 | 4.0 | 2.0 | 5 | 0.008 | N | N | N | N | N | N |
| 18-2 | | | | 0.01 | — | — | — | — | — | — |
| 18-3 | | | | 0.3 | — | — | — | — | — | — |
| *18-4 | | | | 0.5 | N | N | N | N | N | N |

TABLE 4-3

| | Elasticity | | | | Without groove | | Herrigbone grooves | | Vertical grooves | |
|---|---|---|---|---|---|---|---|---|---|---|
| No. | Sleeve (×10⁴ kg/mm²) | Shaft (×10⁴ kg/mm²) | Δα (8 × 10⁶/ °C.) | Eccentricity | 20° C. | 60° C. | 20° C. | 60° C. | 20° C. | 60° C. |
| *19-1 | 3.5 | 3.0 | 4.6 | 0.008 | N | N | N | N | N | N |
| 19-2 | | | | 0.01 | — | — | — | — | — | — |
| 19-3 | | | | 0.3 | — | — | — | — | — | — |
| *19-4 | | | | 0.5 | N | N | N | N | N | N |
| *20-1 | 3.0 | 3.5 | 4.6 | 0.008 | N | N | N | N | N | N |
| 20-2 | | | | 0.01 | — | — | — | — | — | — |
| 20-3 | | | | 0.3 | — | — | — | — | — | — |
| *20-4 | | | | 0.5 | N | N | N | N | N | N |
| *21-1 | 3.5 | 4.0 | 3 | 0.008 | N | N | N | N | N | N |
| 21-2 | | | | 0.01 | — | — | — | — | — | — |
| 21-3 | | | | 0.3 | — | — | — | — | — | — |
| *21-4 | | | | 0.5 | N | N | N | N | N | N |
| *22-1 | 4.0 | 3.5 | 3 | 0.008 | N | N | N | N | N | N |
| 22-2 | | | | 0.01 | — | — | — | — | — | — |
| 22-3 | | | | 0.3 | — | — | — | — | — | — |
| *22-4 | | | | 0.5 | N | N | N | N | N | N |
| *23-1 | 3.0 | 4.0 | 1.6 | 0.008 | N | N | N | N | N | N |
| 23-2 | | | | 0.01 | — | — | — | — | — | — |
| 23-3 | | | | 0.3 | — | — | — | — | — | — |
| *23-4 | | | | 0.5 | N | N | N | N | N | N |
| *24-1 | 4.0 | 3.0 | 1.6 | 0.008 | N | N | N | N | N | N |
| 24-2 | | | | 0.01 | — | — | — | — | — | — |
| 24-3 | | | | 0.3 | — | — | — | — | — | — |
| *24-4 | | | | 0.5 | N | N | N | N | N | N |

Experiment 5

Durability was tested for bearings made of various materials, with certain eccentricities. The results are shown in Tables 5-1 and 5-2.

TABLE 5-1

| No. | Shaft | Sleeve | Eccentricity | Without groove | Herrigbone grooves | Vertical grooves |
|---|---|---|---|---|---|---|
| *1-1 | SUS410 | SUS410 | 0.008 | 2,000 | 20,000 | 30,000 |
| 1-2 | | | 0.01 | 10,000 | 50,000 | 50,000 |
| 1-3 | | | 0.3 | 20,900 | 60,000 | 50,000 |
| *1-4 | | | 0.5 | 10,000 | 30,000 | 40,000 |
| *2-1 | SUS410 | alumina | 0.008 | 100,000 | 150,000 | 160,000 |
| 2-2 | | | 0.01 | ≧1000,000 | ≧1000,000 | ≧1000,000 |
| 2-3 | | | 0.3 | ≧1000,000 | ≧1000,000 | ≧1000,000 |
| *2-4 | | | 0.5 | 80,000 | 120,000 | 150,000 |
| *3-1 | SUS410 | silicone | 0.008 | 90,000 | 100,000 | 100,000 |
| 3-2 | | nitride | 0.01 | ≧1000,000 | ≧1000,000 | ≧1000,000 |
| 3-3 | | | 0.3 | ≧1000,000 | ≧1000,000 | ≧1000,000 |
| *3-4 | | | 0.5 | 110,000 | 150,000 | 150,000 |
| *4-1 | SUS410 | silicone | 0.008 | 110,000 | 130,000 | 140,000 |
| 4-2 | | carbide | 0.01 | ≧1000,000 | ≧1000,000 | ≧1000,000 |
| 4-3 | | | 0.3 | ≧1000,000 | ≧1000,000 | ≧1000,000 |
| *4-4 | | | 0.5 | 120,000 | 130,000 | 130,000 |
| *5-1 | alumina | SUS410 | 0.008 | 15,000 | 20,000 | 30,000 |
| 5-2 | | | 0.01 | 20,000 | 40,000 | 50,000 |
| 5-3 | | | 0.3 | 30,000 | 40,000 | 50,000 |
| *5-4 | | | 0.5 | 10,000 | 20,000 | 20,000 |
| *6-1 | silicone | SUS410 | 0.008 | 35,000 | 50,000 | 60,000 |
| 6-2 | nitride | | 0.01 | 40,000 | 60,000 | 70,000 |
| 6-3 | | | 0.3 | 40,000 | 60,000 | 70,000 |
| *6-4 | | | 0.5 | 30,000 | 40,000 | 60,000 |
| *7-1 | silicone | SUS410 | 0.008 | 20,000 | 40,000 | 50,000 |
| 7-2 | carbide | | 0.01 | 30,000 | 50,000 | 70,000 |
| 7-3 | | | 0.3 | 40,000 | 60,000 | 80,000 |
| *7-4 | | | 0.5 | 30,000 | 30,000 | 40,000 |
| *8-1 | alumina | alumina | 0.008 | 180,000 | 250,000 | 270,000 |
| 8-2 | | | 0.01 | ≧1000,000 | ≧1000,000 | ≧1000,000 |
| 8-3 | | | 0.3 | ≧1000,000 | ≧1000,000 | ≧1000,000 |
| *8-4 | | | 0.5 | 220,000 | 190,000 | 210,000 |
| *9-1 | alumina | silicone | 0.008 | 280,000 | 320,000 | 350,000 |
| 9-2 | | nitride | 0.01 | ≧1000,000 | ≧1000,000 | ≧1000,000 |
| 9-3 | | | 0.3 | ≧1000,000 | ≧1000,000 | ≧1000,000 |
| *9-4 | | | 0.5 | 250,000 | 260,000 | 310,000 |

TABLE 5-2

| No. | Shaft | Sleeve | Eccentricity | Without groove | Herrigbone grooves | Vertical grooves |
|---|---|---|---|---|---|---|
| *10-1 | silicone | alumina | 0.008 | 200,000 | 250,000 | 270,000 |
| 10-2 | nitride | | 0.01 | ≧1000,000 | ≧1000,000 | ≧1000,000 |
| 10-3 | | | 0.3 | ≧1000,000 | ≧1000,000 | ≧1000,000 |
| *10-4 | | | 0.5 | 220,000 | 220,000 | 230,000 |
| *11-1 | silicone | alumina | 0.008 | 180,000 | 200,000 | 210,000 |
| 11-2 | carbide | | 0.01 | ≧1000,000 | ≧1000,000 | ≧1000,000 |
| 11-3 | | | 0.3 | ≧1000,000 | ≧1000,000 | ≧1000,000 |
| *11-4 | | | 0.5 | 220,000 | 230,000 | 230,000 |
| *12-1 | alumina | silicone | 0.008 | 210,000 | 230,000 | 240,000 |
| 12-2 | | carbide | 0.01 | ≧1000,000 | ≧1000,000 | ≧1000000 |
| 12-3 | | | 0.3 | ≧1000,000 | ≧1000,000 | ≧1000,000 |
| *12-4 | | | 0.5 | 220,000 | 220,000 | 230,000 |
| *13-1 | silicone | silicone | 0.008 | 190,000 | 220,000 | 220,000 |
| 13-2 | carbide | nitride | 0.01 | ≧1000,000 | ≧1000,000 | ≧1000,000 |
| 13-3 | | | 0.3 | ≧1000,000 | ≧1000,000 | ≧1000,000 |
| *13-4 | | | 0.5 | 210,000 | 220,000 | 230,000 |
| *14-1 | SUS304 | alumina | 0.008 | 500 | 2,000 | 3,000 |
| 14-2 | | | 0.01 | 2,000 | 3,500 | 5,000 |
| 14-3 | | | 0.3 | 3,000 | 3,000 | 5,000 |
| *14-4 | | | 0.5 | 1,500 | 3,000 | 3,500 |
| *15-1 | SUS304 | silicone | 0.008 | 1,000 | 2,000 | 3,000 |
| 15-2 | | nitride | 0.01 | 2,000 | 3,000 | 5,000 |
| 15-3 | | | 0.3 | 2,000 | 4,000 | 6,000 |
| *15-4 | | | 0.5 | 1,500 | 2,000 | 2,500 |
| *16-1 | alumina | SUS304 | 0.008 | 800 | 2,000 | 3,000 |

TABLE 5-2-continued

| No. | Shaft | Sleeve | Eccentricity | Without groove | Herrigbone grooves | Vertical grooves |
|---|---|---|---|---|---|---|
| 16-2 | | | 0.01 | 1,500 | 3,000 | 5,000 |
| 16-3 | | | 0.3 | 2,000 | 3,000 | 6,000 |
| *16-4 | | | 0.5 | 1,000 | 1,500 | 2,000 |
| *17-1 | silicone | | 0.008 | 1,500 | 3,500 | 5,000 |
| 17-2 | nitride | | 0.01 | 3,000 | 6,000 | 8,000 |
| 17-3 | | | 0.3 | 4,000 | 8,000 | 10,000 |
| *17-4 | | | 0.5 | 2,000 | 4,000 | 6,000 |

What is claimed is:

1. A complex bearing assembly, comprising:
   a base member;
   a first cylindrical member having a cylindrical outer periphery defined therein;
   a second cylindrical member having a cylindrical inner periphery defined therein, said inner periphery having a greater diameter than that of said outer periphery of said first member, wherein said outer periphery of said first member is positioned in said inner periphery of said, second member, and wherein one of said first and second cylindrical members is fixed to said base member so that the other of said first and second cylindrical members rotates relative to said one of said first and second cylindrical members;
   a radial bearing formed by said opposed inner and outer peripheries for supporting said the other cylindrical member in a radial direction relative to said one fixed cylindrical member by means of a hydrodynamic force generated in a rotational movement of said the other rotatable cylindrical member relative to said one fixed cylindrical member between said opposing inner and outer peripheries; and
   an axial bearing having a first magnetic member secured on said the other rotatable cylindrical member and extended around a rotational axis of said bearing assembly and a second magnetic member secured on said one fixed cylindrical member and extended around said first magnetic member while leaving a space therebetween so that said first and second magnetic members cooperate to generate a magnetic force therebetween for supporting said the other rotatable member in an axial direction relative to said one fixed cylindrical member, wherein one of said first and second magnetic member is positioned in a coaxial fashion with said rotational axis of said bearing assembly and the other of said first and second magnetic member is positioned in an eccentric fashion with said rotational axis of said bearing assembly.

2. A bearing assembly in accordance with claim 1, wherein a ratio of an eccentricity of said second magnetic member against said periphery of said one fixed cylindrical member to a mean gap defined between said opposed inner and outer peripheries ranges from about 0.01 to about 0.3.

3. A bearing assembly in accordance with claim 1, wherein a ratio of an eccentricity of said second magnetic member against said periphery of said one fixed cylindrical member to a mean gap defined between said opposed inner and outer peripheries ranges from about 0.02 to about 0.1.

4. A complex bearing assembly, comprising:
   a base member;
   a first cylindrical member having a cylindrical outer periphery defined therein;
   a second cylindrical member having a cylindrical inner periphery defined therein, said inner periphery having a greater diameter than that of said outer periphery of said first member, wherein said outer periphery of said first member is positioned in said inner periphery of said second member, and wherein one of said first and second cylindrical members is fixed to said base member so that the other of said first and second cylindrical members rotates relative to said one of said first and second cylindrical members;
   a radial bearing formed by said opposed inner and outer peripheries for supporting said the other cylindrical member in a radial direction relative to said one fixed cylindrical member by means of a hydrodynamic force generated in a rotational movement of said the other rotatable cylindrical member relative to said one fixed cylindrical member between said opposing inner and outer peripheries; and
   an axial bearing having a first magnetic member secured on said the other rotatable cylindrical member and extended around a rotational axis of said bearing assembly and a second magnetic member secured on said one fixed cylindrical member and extended around said first magnetic member while leaving a space therebetween so that said first and second magnetic members cooperate to generate a magnetic force therebetween for supporting said the other rotatable member in an axial direction relative to said one fixed cylindrical member, wherein one of said first and second magnetic member is positioned in a coaxial fashion with said rotational axis of said bearing assembly and the other of said first and second magnetic member is positioned in an eccentric fashion with said rotational axis of said bearing assembly, wherein said axial bearing includes two pairs of said first and second magnetic members and said two pairs are provided at opposite ends of said one and the other cylindrical members.

5. A complex bearing assembly, comprising:
   a base member;
   a first cylindrical member having a cylindrical outer periphery defined therein;
   a second cylindrical member having a cylindrical inner periphery defined therein, said inner periphery having a greater diameter than that of said outer periphery of said first member, wherein said outer periphery of said first member is positioned in said inner periphery of said second member, and wherein one of said first and second cylindrical members is fixed to said base member so that the other of said first and second cylindrical members rotates relative to said one of said first and second cylindrical members;
   a radial bearing formed by said opposed inner and outer peripheries for supporting said the other cylindrical member in a radial direction relative to said one fixed cylindrical member by means of a hydrodynamic force generated in a rotational movement of said the other rotatable cylindrical member relative to said one fixed cylindrical member between said opposing inner and outer peripheries; and an axial bearing having a first magnetic member secured on said the other rotatable cylindrical member and extended around a rotational axis of said bearing assembly and a second magnetic member secured on said one fixed cylindrical member and extended around said first magnetic member while leaving a space therebetween so that said first and second magnetic members cooperate to generate a magnetic force therebetween for supporting said the other rotatable member in an axial direction relative to said one fixed cylindrical member, wherein one of said first and second magnetic member is positioned in a coaxial fashion with said rotational axis of said bearing assembly and the other of said first and second magnetic member is positioned in an eccentric fashion with said rotational axis of said bearing assembly, wherein said radial bearing meets a following relation:

$$\delta/C \leq 1.0 \times 10^{-4}$$

wherein

δ: a difference of radii of coaxially arranged minimum circumscribed and maximum inscribed circles for said closed loop, and C: a mean diameter of said coaxially arranged minimum circumscribed and maximum inscribed circles.

6. A complex bearing assembly, comprising:

a base member;

a first cylindrical member having a cylindrical outer periphery defined therein;

a second cylindrical member having a cylindrical inner periphery defined therein, said inner periphery having a greater diameter than that of said outer periphery of said first member, wherein said outer periphery of said first member is positioned in said inner periphery of said second member, and wherein one of said fist and second cylindrical members is fixed to said base member so that the other of said first and second cylindrical members rotates relative to said one of said first and second cylindrical members;

a radial bearing formed by said opposed inner and outer peripheries for supporting said the other cylindrical member in a radial direction relative to said one fixed cylindrical member by means of a hydrodynamic force generated in a rotational movement of said the other rotatable cylindrical member relative to said one fixed cylindrical member between said opposing inner and outer peripheries; and an axial bearing having a first magnetic member secured on said the other rotatable cylindrical member and extended around a rotational axis of said bearing assembly and a second magnetic member secured on said one fixed cylindrical member and extended around said first magnetic member while leaving a space therebetween so that said first and second magnetic members cooperate to generate a magnetic force therebetween for supporting said the other rotatable member in an axial direction relative to said one fixed cylindrical member, wherein one of said first and second magnetic member is positioned in a coaxial fashion with said rotational axis of said bearing assembly and the other of said first and second magnetic member is positioned in an eccentric fashion with said rotational axis of said bearing assembly, wherein said radial bearing meets a following relation:

$$\delta/C \leq 7.0 \times 10^{-5}$$

wherein

δ: a difference of radii of coaxially arranged minimum circumscribed and maximum inscribed circles for said closed loop, and C: a mean diameter of said coaxially arranged minimum circumscribed and maximum inscribed circles.

7. A bearing assembly in accordance with claim 1, wherein said inner and/or outer periphery has herringbone or helical grooves formed therein.

8. A complex bearing assembly, comprising:

a base member;

a first cylindrical member having a cylindrical outer periphery defined therein;

a second cylindrical member having a cylindrical inner periphery defined therein, said inner periphery having a greater diameter than that of said outer periphery of said first member, wherein said outer periphery of said first member is positioned in said inner periphery of said second member, and wherein one of said first and second cylindrical members is fixed to said base member so that the other of said first and second cylindrical members rotates relative to said one of said first and second cylindrical members;

a radial bearing formed by said opposed inner and outer peripheries for supporting said the other cylindrical member in a radial direction relative to said one fixed cylindrical member by means of a hydrodynamic force generated in a rotational movement of said the other rotatable cylindrical member relative to said one fixed cylindrical member between said opposing inner and outer peripheries; and an axial bearing having a first magnetic member secured on said the other rotatable cylindrical member and extended around a rotational axis of said bearing assembly and a second magnetic member secured on said one fixed cylindrical member and extended around said first magnetic member while leaving a space therebetween so that said first and second magnetic members cooperate to generate a magnetic force therebetween for supporting said the other rotatable member in an axial direction relative to said one fixed cylindrical member, wherein one of said first and second magnetic member is positioned in a coaxial fashion with said rotational axis of said bearing assembly and the other of said first and second magnetic member is positioned in an eccentric fashion with said rotational axis of said bearing assembly, wherein said inner and outer are designed so that they define one or more enlarged gap portions, each of said enlarged gap portions extending about 40% or more of a longitudinal length of said opposed peripheries.

9. A bearing assembly in accordance with claim 8, wherein said enlarged gap portion has a certain size of less than ten times that of a mean gap between said inner and outer peripheries.

10. A bearing assembly in accordance with claim 8, wherein said enlarged gap portion has a central angle ranges from 3 to 90 degrees.

11. A bearing assembly in accordance with claim 1, wherein a difference in coefficient of thermal expansion between materials of said first and second cylindrical member is $8\times10^{-6}/°$ C. or less.

12. A bearing assembly in accordance with claim 1, wherein said the other rotatable member has an elasticity of about $2.5\times10^4$ kgf/mm$^2$ or more.

13. A bearing assembly in accordance with claim 1, wherein said first and/or second cylindrical member is made of ceramic material.

14. A bearing assembly in accordance with claim 13, wherein said ceramic material is selected from the group consisting of aluminum ceramic, silicon nitride ceramic, and silicon carbide ceramic.

15. A spindle motor having a complex bearing assembly, comprising:

a base member;

a first cylindrical member having a cylindrical outer periphery defined therein;

a second cylindrical member having a cylindrical inner periphery defined therein, said inner periphery having a greater diameter than that of said outer periphery of said first member, wherein said outer periphery of said first member is positioned in said inner periphery of said second member, and wherein one of said first and second cylindrical members is fixed to said base member so that the other of said first and second cylindrical members rotates relative to said one of said first and second cylindrical members;

a radial bearing formed by said opposed inner and outer peripheries for supporting said the other cylindrical member in a radial direction relative to said one fixed cylindrical member by means of a hydrodynamic force generated in a rotational movement of said the other rotatable cylindrical member relative to said one fixed cylindrical member between said opposing inner and outer peripheries; and an axial bearing having a first magnetic member secured on said the other rotatable cylindrical member and extended around a rotational axis of said bearing assembly and a second magnetic member secured on said one fixed cylindrical member and extended around said first magnetic member while leaving a space therebetween so that said first and second magnetic members cooperate to generate a magnetic force therebetween for supporting said the other rotatable member in an axial direction relative to said one fixed cylindrical member, wherein one of said first and second magnetic member is positioned in a coaxial fashion with said rotational axis of said bearing assembly and the other of said first and second magnetic member is positioned in an eccentric fashion with said rotational axis of said bearing assembly.

16. A spindle motor in accordance claim 15, wherein said spindle motor is designed so that, in a rotational movement of said the other rotatable cylindrical member, said the other rotatable cylindrical member loses frictional contacts, with said one fixed cylindrical at the rotational number of 2,000 rpm.

17. A process for manufacturing a complex bearing assembly, comprising the steps of:

providing a assembled complex bearing assembly, said complex bearing assembly including a first member and a second member supported for rotation relative to the first member by radial and axial bearings; and measuring a rotational number of said second member at which said second member, after it is started rotating, becomes to lose frictional contacts with said first member.

18. A spindle motor having a complex bearing assembly, comprising:

a base member;

a first cylindrical member having a cylindrical outer periphery defined therein;

a second cylindrical member having a cylindrical inner periphery defined therein, said inner periphery having a greater diameter than that of said outer periphery of said first member, wherein said outer periphery of said first member is positioned in said inner periphery of said second member, and wherein one of said first and second cylindrical members is fixed to said base member so that the other of said first and second cylindrical members rotates relative to said one of said first and second cylindrical members;

a radial bearing formed by said opposed inner and outer peripheries for supporting said the other cylindrical member in a radial direction relative to said one fixed cylindrical member by means of a hydrodynamic force generated in a rotational movement of said the other rotatable cylindrical member relative to said one fixed cylindrical member between said opposing inner and outer peripheries; and an axial bearing having a first magnetic member secured on said the other rotatable cylindrical member and extended around a rotational axis of said bearing assembly and a second magnetic member secured on said one fixed cylindrical member and extended around said first magnetic member while leaving a space therebetween so that said first and second magnetic members cooperate to generate a magnetic force therebetween for supporting said the other rotatable member in an axial direction relative to said one fixed cylindrical member, wherein one of said first and second magnetic member is positioned in a coaxial fashion with said rotational axis of said bearing assembly and the other of said first and second magnetic member is positioned in an eccentric fashion with said rotational axis of said bearing assembly, wherein said spindle motor is designed so that, in a rotational movement of said the other rotatable cylindrical member, said the other rotatable cylindrical member looses frictional contacts with said one fixed cylindrical at the rotational number of 2,000 rpm.

* * * * *

UNITED STATES PATENT AND TRADEMARK OFFICE
CERTIFICATE OF CORRECTION

PATENT NO. : 6,307,295 B1 Page 1 of 1
APPLICATION NO. : 09/559087
DATED : October 23, 2001
INVENTOR(S) : Kaoru Murabe et al.

It is certified that error appears in the above-identified patent and that said Letters Patent is hereby corrected as shown below:

Replace Figure 2 as shown in the printed patent with the following Figure 2:

Column 4, change line 2 from
"$d_{max}$: Maximum gap between shaft and sleeve" to
--$d_{max}$: Maximum gap between inner and outer magnets--;

Column 4, change line 3 from
"$d_{min}$: Minimum gap between shaft and sleeve" to
--$d_{min}$: Minimum gap between inner and outer magnets--.

Signed and Sealed this

Third Day of October, 2006

JON W. DUDAS
*Director of the United States Patent and Trademark Office*